(12) United States Patent
Notz

(10) Patent No.: US 10,641,351 B2
(45) Date of Patent: May 5, 2020

(54) METHOD FOR MANUFACTURING A CLUTCH BODY

(71) Applicant: HOERBIGER ANTRIEBSTECHNIK HOLDING GMBH, Schongau (DE)

(72) Inventor: Robert Notz, Schongau (DE)

(73) Assignee: HOERBIGER ANTRIEBSTECHNIK HOLDNG GMBH (DE)

( * ) Notice: Subject to any disclaimer, the term of this patent is extended or adjusted under 35 U.S.C. 154(b) by 382 days.

(21) Appl. No.: 15/334,209

(22) Filed: Oct. 25, 2016

(65) Prior Publication Data

US 2017/0114852 A1   Apr. 27, 2017

(30) Foreign Application Priority Data

Oct. 26, 2015   (DE) .......................... 10 2015 118 188

(51) Int. Cl.
| | |
|---|---|
| *F16D 69/04* | (2006.01) |
| *F16D 23/06* | (2006.01) |
| *F16D 23/04* | (2006.01) |
| *F16D 13/24* | (2006.01) |
| *F16D 23/02* | (2006.01) |

(52) U.S. Cl.
CPC ............. *F16D 69/04* (2013.01); *F16D 23/04* (2013.01); *F16D 23/06* (2013.01); *F16D 13/24* (2013.01); *F16D 23/02* (2013.01); *F16D 2023/0625* (2013.01); *F16D 2069/0458* (2013.01); *F16D 2069/0466* (2013.01); *F16D 2069/0491* (2013.01); *F16D 2250/00* (2013.01); *F16D 2250/0007* (2013.01);

(Continued)

(58) Field of Classification Search
CPC ........... F16D 69/04; F16D 13/24; F16D 23/02
See application file for complete search history.

(56) References Cited

U.S. PATENT DOCUMENTS

| | | | |
|---|---|---|---|
| 4,209,086 A | 6/1980 | Friedrich | ......................... 74/468 |
| 4,267,912 A * | 5/1981 | Bauer | ................... F16D 23/025 |
| | | | 192/107 M |

(Continued)

FOREIGN PATENT DOCUMENTS

| | | | | |
|---|---|---|---|---|
| CN | 101144508 | 3/2008 | ............. | F16D 23/00 |
| DE | 10257882 | 7/2004 | ................ | B21J 5/00 |

(Continued)

OTHER PUBLICATIONS

Machine Translation of DE102012212919A1 (Year: 2012).*

(Continued)

*Primary Examiner* — Jacob J Cigna
*Assistant Examiner* — Michael W Hotchkiss
(74) *Attorney, Agent, or Firm* — Hayes Soloway PC

(57) ABSTRACT

A method for manufacturing a clutch body for a synchronizing device of a transmission includes the steps of:
  a) providing an externally toothed clutch disk,
  b) providing a counterfriction ring,
  c) applying a friction lining onto the counterfriction ring,
  d) establishing a non-releasable connection between the clutch disk and the counterfriction ring, and
  e) upsetting a portion of the counterfriction ring at least partly provided with the friction lining in radially inwardly facing direction, so that a counterfriction cone is formed, which is provided for cooperation with a friction surface of the synchronizer ring.

8 Claims, 1 Drawing Sheet

(52) U.S. Cl.
CPC ............... *F16D 2250/0023* (2013.01); *F16D 2250/0069* (2013.01); *F16D 2250/0076* (2013.01)

(56) References Cited

U.S. PATENT DOCUMENTS

| | | | | |
|---|---|---|---|---|
| 4,732,247 | A * | 3/1988 | Frost | F16D 23/06 |
| | | | | 192/53.31 |
| 4,762,214 | A * | 8/1988 | Hadaway | F16D 13/64 |
| | | | | 192/107 C |
| 4,770,283 | A * | 9/1988 | Putz | B21D 53/16 |
| | | | | 192/107 M |
| 4,883,638 | A * | 11/1989 | Blankenhagen | F16C 33/14 |
| | | | | 419/9 |
| 4,931,117 | A * | 6/1990 | Muller | B22F 7/08 |
| | | | | 156/245 |
| 4,940,565 | A * | 7/1990 | Muller | F16D 23/025 |
| | | | | 419/2 |
| 4,951,798 | A * | 8/1990 | Knoess | F16D 23/025 |
| | | | | 192/107 M |
| 5,105,522 | A * | 4/1992 | Gramberger | F16D 23/025 |
| | | | | 192/107 M |
| 5,143,192 | A * | 9/1992 | Vojacek | F16D 23/025 |
| | | | | 192/107 M |
| 5,343,993 | A * | 9/1994 | Soffa | F16D 23/06 |
| | | | | 192/107 M |
| 5,407,043 | A * | 4/1995 | Yamada | F16D 23/025 |
| | | | | 192/107 M |
| 6,016,895 | A * | 1/2000 | Schwuger | F16D 23/06 |
| | | | | 192/53.34 |
| 6,090,320 | A * | 7/2000 | Grundner | B22F 5/08 |
| | | | | 156/308.2 |
| 6,176,635 | B1 * | 1/2001 | Rank | F16D 23/025 |
| | | | | 192/53.34 |
| 6,939,427 | B1 * | 9/2005 | Anma | F16D 13/64 |
| | | | | 156/265 |
| 7,069,636 | B2 * | 7/2006 | Guthrie | F16D 23/025 |
| | | | | 192/107 R |
| 8,607,951 | B2 * | 12/2013 | Schauer | F16D 23/06 |
| | | | | 192/53.34 |
| 9,151,340 | B1 * | 10/2015 | Braukmann | F16D 13/24 |
| 9,777,800 | B2 | 10/2017 | Spreckels | F16H 3/38 |
| 9,909,627 | B2 * | 3/2018 | Fuerguth | F16D 23/025 |
| 2017/0114852 | A1 * | 4/2017 | Notz | F16D 69/04 |
| 2018/0216673 | A1 * | 8/2018 | Gotz | F16D 13/648 |
| 2018/0347678 | A1 * | 12/2018 | Kim | F16H 48/11 |

FOREIGN PATENT DOCUMENTS

| | | | | |
|---|---|---|---|---|
| DE | 102012212919 A1 * | 1/2014 | ............ | B21D 53/88 |
| DE | 102013215617 | 7/2014 | ............ | F16D 23/04 |
| JP | H0231060 | 2/1990 | ............ | B23K 33/00 |
| JP | 05106643 A * | 4/1993 | ............ | F16D 23/06 |
| KR | 20060030325 | 4/2006 | ............ | F16D 23/06 |
| WO | WO-2008064968 A1 * | 6/2008 | ............ | F16D 23/06 |
| WO | WO2008077733 | 7/2008 | ............ | F16D 23/02 |

OTHER PUBLICATIONS

Machine Translation of WO2008064968 (Year: 2008).*
Machine Translation of JP-05106643-A (Year: 1993).*
Chinese Office Action (w/translation) issued in application No. 201610951050.7, dated Mar. 5, 2019 (12 pgs).

* cited by examiner

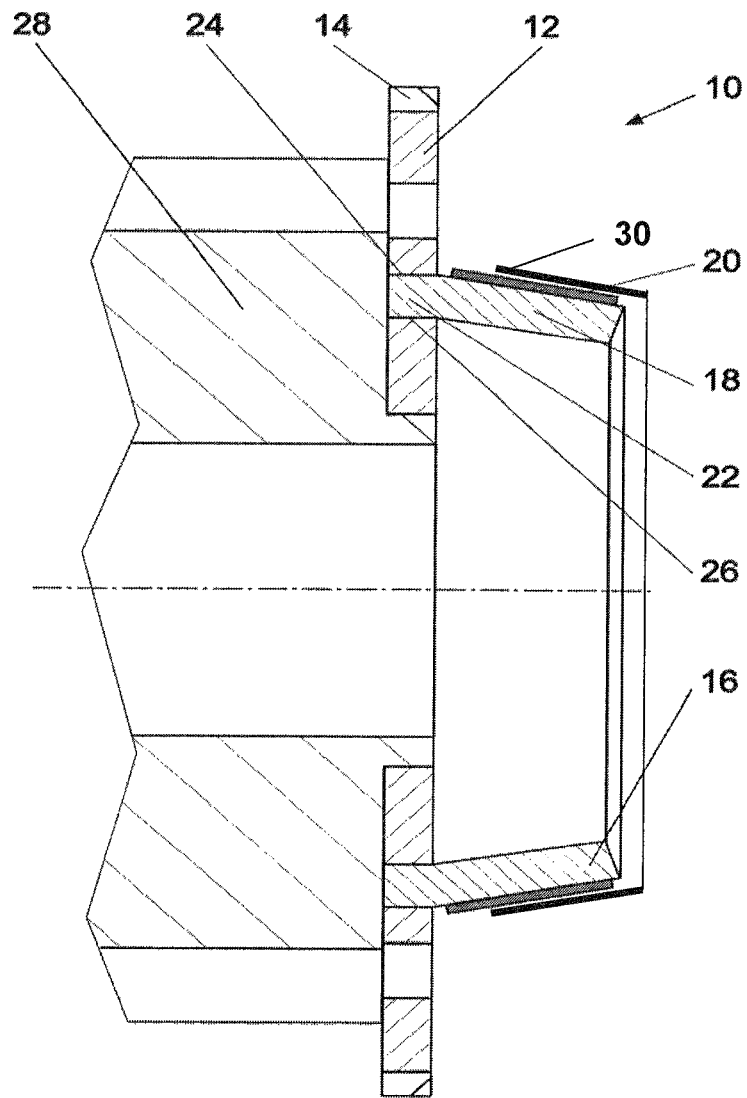

METHOD FOR MANUFACTURING A CLUTCH BODY

FIELD OF THE INVENTION

This invention relates to a method for manufacturing a clutch body for a synchronizing device of a transmission.

BACKGROUND

Clutch bodies as mentioned above are used in particular in vehicle transmissions and in the completely mounted condition are non-rotatably connected with a gear wheel of a transmission formed as idler gear. For example, the clutch body can be part of a locking synchronizer, in which the synchronization is effected via one or more friction cones.

During the shifting operation the clutch body in cooperation with a synchronizer ring on the one hand serves for synchronizing the speed of the idler gear with the speed of the respectively associated transmission shaft. On the other hand, a non-rotatable coupling between the idler gear and the transmission shaft is achieved via the clutch body by means of a sliding sleeve.

The technical problem underlying the present invention consists in indicating a method which in a simple way provides for an inexpensive manufacture of a clutch body for a synchronizing device of a transmission.

SUMMARY

The present invention provides a method for manufacturing a clutch body for a cone synchronizer of a transmission, wherein the following method steps are carried out:

a) providing an externally toothed clutch disk which is provided for cooperation with a sliding sleeve, b) providing a counterfriction ring which is provided for cooperation with a synchronizer ring, c) applying a friction lining onto the counterfriction ring, d) establishing a non-releasable connection between the clutch disk and the counterfriction ring, and e) upsetting a portion of the counterfriction ring at least partly provided with the friction lining in radially inwardly facing direction, so that a counterfriction cone is formed, which is provided for cooperation with a friction surface of the synchronizer ring.

The clutch body manufactured according to the method described above hence is composed in at least two parts of a clutch disk and a counterfriction ring, which initially in method step a) and in method step b) are independently provided as separate components. Both the clutch disk and the counterfriction ring therefore can be designed and fabricated individually with respect to the respectively occurring operating loads.

The clutch disk can be manufactured of a different material than the counterfriction ring. Alternatively or in addition, both components can be subjected to a heat treatment separate from each other, i.e. before their connection.

Furthermore, it is possible to manufacture the clutch disk as forged blank, precision casting or powder-metallurgically. The counterfriction ring usually is a circularly cylindrical steel sleeve.

The separate provision of the clutch disk and the counterfriction ring in general results in a high flexibility with respect to the material selection, the realization of the requested component geometry in terms of manufacture, and the aftertreatment and optimization of functional surfaces, such as tooth flanks, friction surfaces or the like.

Before the counterfriction ring is connected with the clutch disk, a friction lining is applied onto the counterfriction ring in method step c). This can be effected for example by coating, e.g. stray sintering, or by gluing an already prefabricated friction lining, in particular a paper or carbon lining.

Subsequently, a non-releasable, in particular mechanical connection between the clutch disk and the counterfriction ring is established in method step d). The clutch disk and the counterfriction ring accordingly are non-rotatably connected with each other.

In method step e), finally, upsetting of a portion of the counterfriction ring at least partly provided with the friction lining is effected in radially inwardly facing direction, so that a counterfriction cone is formed, which is provided for cooperation with a friction surface of the synchronizer ring.

Upsetting (in another word: compressing) in radially inwardly facing direction corresponds to narrowing of the counterfriction ring in direction of a central axis of the clutch body. In other words, the counterfriction cone is tapered proceeding from a fastening portion formed between the clutch disk and the counterfriction ring in a direction pointing away from the clutch disk.

For example, the portion of the counterfriction ring to be shaped in method step e) and at least partly provided with the friction lining can be an axial end of a purely circularly cylindrical tube.

A portion of the counterfriction ring hence is plastically deformed to a counterfriction cone by upsetting, wherein the counterfriction cone in particular is permanently connected with the clutch disk before upsetting, and in any case is provided with the finished friction lining before upsetting.

The counterfriction cone along with the friction lining accordingly can be shaped precisely in method step e). As compared to a procedure which provides a separate provision of an already conically shaped counterfriction ring, it can thus be avoided that the counterfriction cone is deformed by connecting the clutch disk and the counterfriction ring or the friction lining is damaged.

With the indicated method a calibration of the counterfriction cone and/or of the friction lining provided on the counterfriction cone accordingly can be effected when manufacturing the counterfriction cone, without incurring the risk of a mechanical or thermal impairment of the shape of the friction cone by subsequent manufacturing steps.

According to a development of the method described above, the circumferentially closed friction lining is applied onto an external shell surface of the counterfriction ring in method step c).

According to a further aspect of the method the counterfriction ring provided in method step b) can have an at least sectionally circularly cylindrical, i.e. tubular shape. In the following method step c) at least one shell surface of the friction ring can be provided with a friction lining.

The clutch disk and the counterfriction ring can include form elements for establishing a non-releasable positive connection. In method step d), the two separately provided components in particular can be connected with each other without thermal joining methods.

Counterfriction ring and clutch body for example can be connected into a snug fit by flow molding, caulking, riveting and/or additionally by welding.

According to a development of the method the counterfriction ring includes axially projecting protrusions which after establishing the non-releasable connection according to method step d) engage into recesses formed on the clutch disk. The positive connection equally can serve both the axial and the non-rotatable connection of the two components relative to each other. Protrusions and the walls of the recesses can be connected with each other by shaping.

One embodiment of the invention provides that the recesses in the clutch disk are circumferentially closed, axially continuous windows. The preferably complementarily designed protrusions of the counterfriction ring then protrude into these windows. Hence, a mechanical coupling is achieved already in circumferential direction. The protrusions can be manufactured with an oversize with respect to the recesses, which however is not necessarily the case, so that they are deformed plastically when they are axially pressed into the recesses.

To achieve a low-noise synchronization in the completely mounted condition, the external toothing of the clutch disk and the friction cone are arranged coaxially.

Furthermore, an in particular substantially circularly cylindrical receptacle provided at the clutch disk, which is provided for attachment of the clutch disk to the idler gear, can be arranged coaxially to the clutch disk and/or the friction cone.

In particular, the external toothing of the clutch disk, a portion of the counterfriction ring associated to the clutch disk and the in particular substantially circularly cylindrical receptacle of the clutch disk can be arranged concentrically to the central axis of the clutch body.

When reference is made here to concentricity or coaxiality, these terms are to be understood against the background of usual manufacturing tolerances.

To improve the coaxiality or the concentricity between the clutch disk and the counterfriction cone, the clutch disk can include at least one abutment surface which is provided for supporting the friction ring in radially inwardly facing direction. The abutment surface is present at several recesses which serve for accommodating axially projecting protrusions of the counterfriction cone.

DETAILED DESCRIPTION

Figure 1:
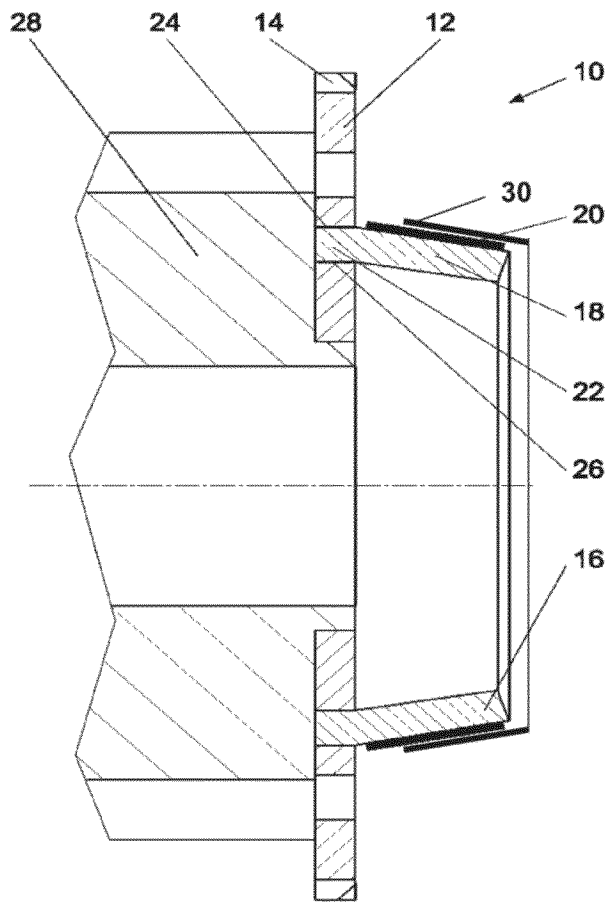
FIG. 1 schematically shows a clutch body manufactured by the method according to the invention.

FIG. 1 shows a clutch body 10 for a synchronizing device of a transmission.

The clutch body 10 includes a clutch disk 12 which has an external toothing 14. The external toothing 14 is provided for cooperation with an internally toothed sliding sleeve (not shown).

In addition, the clutch body 10 comprises a counterfriction ring 16 which is provided for cooperation with a synchronizer ring 30. The counterfriction ring 16 has a counterfriction cone 18 on which a friction lining 20 is applied. The friction lining 20 is provided for cooperation with a friction surface of the synchronizer ring 30 which is depicted in a symbolized manner.

The clutch disk 12 and the counterfriction ring 16 are non-releasably connected with each other. The counterfriction ring 16 includes axially projecting protrusions 22 which engage into recesses 24 provided at the clutch disk 12. The recesses are provided in several windows arranged on a circle, circumferentially closed as seen in axial direction, i.e. framed in a circumferentially closed manner, which can be produced by stamping.

In the region of the protrusions 22 the clutch disk 12 includes an abutment surface 26 as part of the window boundary, which is provided to support the counterfriction ring 16 in radially inwardly facing direction.

The clutch body 10 has a centric opening whose rim is seated on an idler gear 28 and is non-rotatably connected there with the idler gear 28, e.g. by plastic deformation, press fit or welding.

A method for manufacturing such clutch body 10 will now be described in detail below.

Initially, the externally toothed clutch disk 12 is provided.

Separately and independent of the externally toothed clutch disk 12 the counterfriction ring 16 is provided in the form of a circularly cylindrical tube.

The friction lining 20 is applied onto the counterfriction ring 16. This can be effected for example by coating, in particular stray sintering, or by gluing a friction lining prepared already.

For establishing a non-releasable connection, the counterfriction ring 16 e.g. is caulked with the clutch disk 12. In the connected condition, the axially projecting protrusions 22 of the counterfriction ring 16 engage into the recesses 24 of the clutch disk 12.

The recesses 24 and protrusions 22 can be produced for example by machining before connecting the components 12, 16.

Finally, the counterfriction cone 18 of the counterfriction ring 16 is formed. For this purpose, the counterfriction ring 16 provided with the friction lining 20 is upset in the region of the friction lining 20 in radially inwardly facing direction, e.g. by pushing an internal cone onto the same. After the upsetting operation, the counterfriction ring 16 is conically tapered in a direction pointing away from the clutch disk 12.

The invention claimed is:

1. A method for manufacturing a clutch body for a synchronizing device of a transmission, comprising the steps of:
   a) providing an externally toothed clutch disk which is configured for cooperation with a sliding sleeve,
   b) providing a counterfriction ring which is configured for cooperation with a synchronizer ring, wherein the counterfriction ring has an at least sectionally circularly cylindrical tubular shape,
   c) applying a friction lining onto the counterfriction ring,
   d) establishing a non-releasable connection between the clutch disk and the counterfriction ring, and thereafter
   e) upsetting and thereby plastically deforming the at least sectionally circularly cylindrical portion of the counterfriction ring at least partly provided with the friction lining in radially inwardly facing direction, so that a counterfriction cone is formed, which is provided for cooperation with a friction surface of the synchronizer ring.

2. The method according to claim 1, wherein in method step c) the friction is applied onto an external shell surface of the counterfriction ring in a circumferentially closed manner.

3. The method according to claim 1, wherein the clutch disk and the counterfriction ring are connected with each other by flow molding, caulking, riveting and/or welding.

4. The method according to claim 1, wherein the clutch disk includes at least one abutment surface configured for supporting the counterfriction ring on the clutch disk in a radially inwardly facing direction.

5. The method according to claim 1, wherein step d) is carried out after step c).

6. The method according to claim 1, wherein the clutch disk and the counterfriction ring include form elements in a form of recesses and axially projecting protrusions configured for establishing a non-releasable positive connection.

7. The method according to claim 6, wherein the counterfriction ring includes the axially projecting protrusions configured to engage into the recesses formed on the clutch disk to establish the non releasable positive connection.

8. The method according to claim 7, wherein the recesses are circumferentially closed, axially continuous windows in the clutch disk.

* * * * *

UNITED STATES PATENT AND TRADEMARK OFFICE
CERTIFICATE OF CORRECTION

PATENT NO. : 10,641,351 B2
APPLICATION NO. : 15/334209
DATED : May 5, 2020
INVENTOR(S) : Notz Page 1 of 2

It is certified that error appears in the above-identified patent and that said Letters Patent is hereby corrected as shown below:

In the Drawings

--FIG. 1-- is not stated on Figure 1 and should be added as shown on the attached drawing sheet.

In the Claims

Claim 2, Column 4, Line 56, "friction is applied" should be --friction lining is applied--.
Claim 7, Column 5, Line 8, "the non releasable" should be --the non-releasable--.

Signed and Sealed this
Fourth Day of March, 2025

Coke Morgan Stewart
*Acting Director of the United States Patent and Trademark Office*